United States Patent Office 2,943,125
Patented June 28, 1960

2,943,125

PRODUCTION OF DIMERS AND LOW MOLECULAR POLYMERIZATION PRODUCTS FROM ETHYLENE

Karl Ziegler and Heinz Martin, both of Kaiser Wilhelm Platz 1, Muelheim-Ruhr, Germany; said Martin assignor to said Ziegler No Drawing. Filed July 27, 1955, Ser. No. 524,799

Claims priority, application Germany Aug. 7, 1954

8 Claims. (Cl. 260—683.15)

This invention relates to the production of dimers and low molecular polymerization products from ethylene.

The invention more particularly relates to and has as its object the polymerization of ethylene with the formation of butene along with hexene and its homologues in yields of more than 30%.

In accordance with the invention, the ethylene polymerization is effected using as a polymerization catalyst a mixture of an aluminum trialkyl along with a titanium or zirconium tetrabutyl ester.

The polymerization is merely effected by contacting the ethylene with the catalyst mixture. The ethylene pressure of the contacting or the partial ethylene pressure may be between 0.2 and 20 atmospheres, and preferably between about 1 and 10 atmospheres.

The polymerization will commence at a relatively low temperature of, for example, about 20° C., and may be effected at temperatures ranging up to 150° C. and more, though temperatures between about 30 and 100°, and preferably between about 50 and 100° C. are preferred.

The polymerization may be effected in any suitable vessel, as, for example, an autoclave, though it has been found preferable to continuously recycle the ethylene through the polymerization mixture. The ethylene recycled in this manner will carry the volatile polymerization products formed along with it, and these products may be condensed out, as, for example, by cooling at one point in the cycle and fresh ethylene may be added at another point in the cycle in a quantity corresponding to the quantity consumed in the polymerization.

The catalyst is formed by merely mixing the titanium or zirconium tetrabutyl ester, preferably dissolved in a solvent, as for example, diesel oil, with the aluminum trialkyl compound in an inert atmosphere, as for example under nitrogen. The catalyst mixture formed is preferably dissolved in a solvent, as, for example, diesel oil, prior to use.

The polymers formed by the polymerization in accordance with the invention are olefins, consisting predominantly of n-butene, and particularly n-butene-(1). In addition, higher olefins, such as hexene and octene, are formed. There are also obtained as by-products in the process minor quantities of a few percent of higher molecular polyethylenes.

The following examples are given by way of illustration and not limitation:

Example 1

250 cc. of a Fischer-Tropsch diesel oil (distilled over sodium), 27.6 grams aluminum triethyl and 8.5 grams titanium tetrabutyl ester were mixed with each other under nitrogen. There was produced a clear, deep red solution. The catalyst prepared in this manner was dissolved in 2 liters of the same diesel oil and ethylene was introduced while stirring at 50° C. The temperature was brought to 90° C. over the course of 4 hours and held at this temperature. The ethylene was absorbed at a rate of 30 to 40 liters per hour. At the beginning of the experiment, the ethylene was practically completely absorbed by suitably regulating its velocity. In the later phases, as soon as the solution became saturated with butylene, butylene escaped from the reaction mixture. During the first 6 hours, 45 grams of $C_4$ hydrocarbons evolved from the mixture and were collected in a receiver cooled to a low temperature. During the next 20 hours, 115 grams volatile olefins, consisting essentially of $C_4$ were collected. After a further 15 hours, a further 22 grams were measured. During these last phases of the experiment, the ethylene which was passed through forced the resultant polymerization products out of the heated diesel oil. Aluminum triethyl was again added to the reaction mixture after the butylene yield had thus decreased, the formation of butene again became very energetic. The volatile polymerization products obtained by deep cooling from the gases evolved were purified and distilled. In this way there was obtained all except 10% of the total quantity of butylene. The higher boiling residue was a mixture of hexene and octene. The butene consisted exclusively of n-butene containing 67% alphabutene. Small quantities of difficultly soluble flakes of polyethylene had formed in the reaction solution. An experiment using zirconium tetrabutyl ester instead of the titanium ester proceeded in an identical manner.

Example 2

Through a concentrated catalyst consisting of 17 grams titanium tetrabutyl ester and 27 grams aluminum trihexyl in 250 cc. of diesel oil, ethylene was blown at 60° C. in a circulatory apparatus. The discharging ethylene was conducted to a receiver, cooled to —80° C., and then recycled. At one point of the recycle system, fresh ethylene was introduced in an amount equal to that consumed. At the beginning of the experiment, the installation produced 70 grams of volatile ethylene polymers per hour, which separated in the receiver, at a recycle rate of 220 liters of ethylene per hour, i.e., with a 20% conversion by the catalyst upon a single passage of the ethylene. The activity of the catalyst decreased gradually, and after 4 to 5 hours the catalyst produced 12 grams volatile polymers per hour. When, after such a decrease in the activity of the catalyst, 10 cc. of aluminum trihexyl were again added, the activity again rose to 25 grams of volatile ethylene polymers per hour. The activation could be repeated several times. With the relatively small amounts of catalyst indicated, it is easy to prepare a total of about 1 kg. of volatile ethylene polymers consisting mainly of butene-(1). There continuously deposit in the volatile catalysts certain portions consisting of a high molecular solid polyethylene which can be separated, in continuous operation, from time to time by filtration or centrifuging under nitrogen.

Example 3

9.6 grams zirconium tetrabutyl ester, dissolved in 100 cc. Fischer-Tropsch diesel oil, are stirred into a solution of 49.5 grams aluminum triisobutyl in 200 cc. of diesel oil. The mixture slowly changes color to a yellow and then to a brownish-black. It is heated to 70° C. and ethylene introduced with strong agitation. 43 grams of condensate collects in the course of 6 hours in a receiver cooled to —80° C. connected to the reaction vessel. The condensate consists of 35% isobutene and 65% n-butene.

We claim:

1. Process for the polymerization of ethylene which comprises contacting ethylene with a polymerization catalyst comprising a mixture of an aluminum trialkyl and a member selected from the group consisting of titanium tetrabutyl ester and zirconium tetrabutyl ester, the mol ratio of aluminum trialkyl to said group member having a value not in excess of 10:1 and being such that predominantly dimerization of said ethylene occurs, recycling the ethylene back for further contact with said catalyst and removing the polymerization product formed consisting predominantly of butene from the ethylene prior to said further contact.

2. Process according to claim 1 which includes adding ethylene to the recycled ethylene in amount substantially corresponding to the amount of ethylene consumed in the polymerization.

3. Process according to claim 2 in which the polymerization product is removed from the ethylene by condensation.

4. Process according to claim 1 in which said contacting is effected with an ethylene pressure between about 0.2 and 20 atmospheres.

5. Process according to claim 4, in which said contacting is effected with an ethylene pressure between about 1 and 10 atmospheres.

6. Process according to claim 1 in which said contacting is effected at a temperature between about 20 and 150 degrees C.

7. Process according to claim 6 in which said contacting is effected at a temperature between about 50 and 100 degrees C.

8. Process according to claim 7 in which said contacting is effected with an ethylene pressure between about 1 and 10 atmospheres.

References Cited in the file of this patent

UNITED STATES PATENTS

| | | |
|---|---|---|
| 2,440,498 | Young et al. | Apr. 27, 1948 |
| 2,699,457 | Ziegler et al. | Jan. 11, 1955 |
| 2,721,189 | Anderson et al. | Oct. 18, 1955 |
| 2,781,410 | Ziegler et al. | Feb. 12, 1957 |

FOREIGN PATENTS

| | | |
|---|---|---|
| 533,362 | Belgium | May 16, 1955 |